United States Patent
Ishida et al.

(10) Patent No.: US 11,104,319 B2
(45) Date of Patent: Aug. 31, 2021

(54) BRAKING CONTROL DEVICE FOR VEHICLE

(71) Applicant: ADVICS CO., LTD., Kariya (JP)

(72) Inventors: Yasuhito Ishida, Toyokawa (JP);
Takayuki Yamamoto, Nagakute (JP)

(73) Assignee: ADVICS CO., LTD., Kariya (JP)

( * ) Notice: Subject to any disclaimer, the term of this patent is extended or adjusted under 35 U.S.C. 154(b) by 303 days.

(21) Appl. No.: 16/316,878

(22) PCT Filed: Jul. 14, 2017

(86) PCT No.: PCT/JP2017/025697
§ 371 (c)(1),
(2) Date: Jan. 10, 2019

(87) PCT Pub. No.: WO2018/012613
PCT Pub. Date: Jan. 18, 2018

(65) Prior Publication Data
US 2019/0299958 A1 Oct. 3, 2019

(30) Foreign Application Priority Data

Jul. 15, 2016 (JP) ............................. JP2016-139884

(51) Int. Cl.
*B60T 17/22* (2006.01)
*B60T 8/17* (2006.01)
*B60T 13/12* (2006.01)

(52) U.S. Cl.
CPC ................ *B60T 17/22* (2013.01); *B60T 8/17* (2013.01); *B60T 13/12* (2013.01)

(58) Field of Classification Search
CPC . B60T 17/22; B60T 8/17; B60T 13/12; B60T 8/88; B60T 2270/40; B60T 17/221; B60T 7/042
See application file for complete search history.

(56) References Cited

U.S. PATENT DOCUMENTS

| | | | |
|---|---|---|---|
| 2013/0207452 A1* | 8/2013 | Gilles | B60T 8/4018 303/9.75 |
| 2015/0151726 A1* | 6/2015 | McClain | B60T 8/92 303/15 |

(Continued)

FOREIGN PATENT DOCUMENTS

| | | |
|---|---|---|
| JP | 2014004879 A | 1/2014 |
| JP | 2014097687 A | 5/2014 |

OTHER PUBLICATIONS

International Search Report (with English translation) and Written Opinion issued in corresponding International Patent Application No. PCT/JP2017/025697, 8 pages (dated Oct. 10, 2017).

*Primary Examiner* — Melanie Torres Williams
(74) *Attorney, Agent, or Firm* — Buchanan Ingersoll & Rooney PC (57) ABSTRACT

A braking control device for imparting brake fluid pressure on wheel cylinders in response to operation of a braking operation member to produce braking force includes: first and second fluid pressure units for imparting brake fluid pressure by first and second power sources respectively; and a determining device for determining whether or not operation of the first fluid pressure unit is appropriate. When the determining device determines that operation is appropriate, the first fluid pressure unit imparts brake fluid pressure based on a suitability characteristic, which is the relationship between the brake fluid pressure and the braking operation member operation amount, set in advance. The second fluid pressure unit has proximity characteristics, generally matching the suitability characteristic, and notification characteristics, different from the suitability characteristic. When operation of the first fluid pressure unit is not appropriate, the second fluid pressure unit imparts brake fluid pressure based on the proximity or notification characteristics.

18 Claims, 5 Drawing Sheets

(56) References Cited

U.S. PATENT DOCUMENTS

| | | | |
|---|---|---|---|
| 2016/0009257 A1* | 1/2016 | Joyce | B60T 8/171 |
| | | | 701/70 |
| 2018/0273008 A1* | 9/2018 | Kim | B60T 13/58 |

* cited by examiner

BRAKING CONTROL DEVICE FOR VEHICLE

TECHNICAL FIELD

The present invention relates to a braking control device for a vehicle.

BACKGROUND ART

Patent Literature 1 describes, in an aim of "suppressing supply of fluid pressure to a wheel cylinder with both a fluid pressure control mechanism and a booster mechanism", that "a first ECU 26 controls an electric actuator 20 of an electric booster device 16. A second ECU 33 controls the operation of an ESC 31 which is a fluid pressure control device. The second ECU 33 operates the ESC 31 to perform a backup control of supplying a brake fluid to wheel cylinders 3L, 3R, 4L, 4R when determined that the first ECU 26 has failed. On the other hand, the first ECU 26 does not control the electric actuator 20 when the second ECU 33 performs the backup control".

Patent Literature 2 discloses, in an aim of "enhancing practicality of a force source dependent vehicle braking system", "a force source device (e.g., high pressure source device that supplies a high pressure operating fluid) that generates a force different from a brake operation force of a driver applied to a braking operation member is arranged, where at a normal time, in a vehicle brake system configured so that a brake force generated by a brake device provided on a wheel becomes a brake force dependent on a force source force, which is a force generated by the force source device, a brake force GT having a magnitude of a middle of a brake force GN generated in the normal mode and a brake force GD generated at a defect mode is generated upon transitioning from the normal mode to the defect mode through some kind of defect during the brake operation".

Patent Literature 1 describes the backup control of operating the fluid pressure control device to supply the brake fluid to a wheel cylinder when determined that the electric booster device has malfunctioned. Furthermore, Patent Literature 2 describes operation characteristics in a case where the brake device has malfunctioned. Specifically, in the device described in Patent Literature 2, sudden change in the brake force (braking force) is suppressed or alleviated, stable brake force is generated and satisfactory feeling of brake operation is obtained. However, there are still differences between "normal characteristics" and "intermediate magnitude characteristics", and thus it is desirable that the difference be reduced. If there is no difference in the operation characteristics, the driver is unlikely to notice the malfunction of the device. For this reason, a braking control device with which the driver's discomfort is as small as possible while the notification to the driver is appropriately carried out is desired.

CITATIONS LIST

Patent Literature

Patent Literature 1: Japanese Laid-Open Patent Application Publication No. 2014-097687

Patent Literature 2: Japanese Laid-Open Patent Application Publication No. 2014-004879

SUMMARY OF INVENTION

Technical Problems

It is an object of the present invention to provide a braking control device for a vehicle in which, when the device has malfunctioned, the operation characteristics of the driver are appropriately adjusted, the discomfort to the driver is suppressed, and this is reliably notified.

Solutions to Problems

A braking control device for a vehicle according to the present invention generates a braking force at a wheel (WH) by imparting a brake fluid pressure (Pwc) on a wheel cylinder (WC) in accordance with an operation of a braking operation member (BP) of the vehicle. The braking control device for the vehicle includes a first fluid pressure unit (EAA) that imparts the brake fluid pressure (Pwc) by a first power source (PUA), a second fluid pressure unit (EAB) that imparts the brake fluid pressure (Pwc) by a second power source (PUB) different from the first power source (PUA), and an appropriateness determining means (HNA, HNB) that determines the appropriateness of the operating state of the first fluid pressure unit (EAA).

In the braking control device for the vehicle according to the present invention, when the appropriateness determining means (HNA, HNB) determines that "the operating state of the first fluid pressure unit (EAA) is appropriate", the first fluid pressure unit (EAA) imparts the brake fluid pressure (Pwc) based on a suitability characteristic (CHgo), which is a relationship between an operation amount (Bpa) of the braking operation member set in advance and the brake fluid pressure (Pwc). The second fluid pressure unit (EAB) has a proximity characteristic (CHgp) that substantially matches the suitability characteristic (CHgo) and a notification characteristic (CHbp, CHzg, CHkr) different from the suitability characteristic (CHgo); and imparts the brake fluid pressure (Pwc) based on at least either one of the proximity characteristic (CHgp) and the notification characteristic (CHbp, CHzg, CHkr) when the appropriateness determining means (HNA, HNB) determines that "the operating state of the first fluid pressure unit (EAA) is not appropriate".

In the braking control device for the vehicle according to the present invention, the second fluid pressure unit (EAB) imparts the brake fluid pressure (Pwc) based on the proximity characteristic (CHgp) when an operation equivalent amount (Bpa, Gxa, Pwc) equivalent to the operation amount (Bpa) of the braking operation member (BP) is smaller than a predetermined value (bpx), and imparts the brake fluid pressure (Pwc) based on the notification characteristic (CHbp) when the operation equivalent amount (Bpa, Gxa, Pwc) is greater than or equal to the predetermined value (bpx). Here, the second fluid pressure unit (EAB) sets the predetermined value (bpx) to a value equivalent to "0.3 to 0.4 G" of the deceleration (Gxa) of the vehicle.

In the braking control device for the vehicle according to the present invention, the second fluid pressure unit (EAB) imparts the brake fluid pressure (Pwc) based on the proximity characteristic (CHgp) when the operation amount (Bpa) increases, and imparts the brake fluid pressure (Pwc) based on the notification characteristic (CHzg) when the operation amount (Bpa) decreases.

In the braking control device for the vehicle according to the present invention, in the second fluid pressure unit (EAB) counts number of repetitions (NKR) of a series of operations of the braking operation member (BP) from a time when the appropriateness determining means (HNA, HNB) determines that the operating state of the first fluid pressure unit (EAA) is not appropriate based on the operation amount (Bpa), imparts the brake fluid pressure (Pwc) based on the proximity characteristic (CHgp) when the number of repetitions (NKR) is smaller than a predetermined number of times (nkx), and imparts the brake fluid pressure (Pwc) based on the notification characteristic (CKkr) when the number of repetitions (NKR) is greater than or equal to the predetermined number of times (nkx). Furthermore, the second fluid pressure unit (EAB) reduces the notification characteristic (CHkr) according to the increase in the number of repetitions (NKR) when the number of repetitions (NKR) is greater than or equal to the predetermined number (nkx).

According to the above configuration, when the first fluid pressure unit EAA malfunctions, a substitution control is executed by the second fluid pressure unit EAB, and the brake fluid pressure Pwc corresponding to the operation amount Bpa is imparted. Two different characteristics (calculation map) are provided in the second fluid pressure unit EAB as characteristics of the substitution control (referred to as substitution characteristics). The approximate characteristic CHgp (when the specific condition JSP is satisfied) which is one of the two characteristics is a characteristic similar to the suitability characteristic CHgo when the first fluid pressure unit EAA is in the suitable state. Therefore, at the time of malfunction of the first fluid pressure unit EAA, a sense of discomfort to the driver is suppressed. The notification characteristics CHbp, CHzg, CHkr (when the specific condition JSP is not satisfied), which are the other characteristics of the two characteristics, are different from the suitability characteristic CHgo. As a result of adopting the notification characteristics CHbp, CHzg, CHkr, the malfunction of the first fluid pressure unit EAA is notified to the driver by the relationship (operation characteristic) of the vehicle deceleration Gxa with respect to the braking operation amount Bpa. The malfunction of the first fluid pressure unit EAA can be notified to the driver without discomfort by the two different substitution characteristics.

DESCRIPTION OF EMBODIMENTS

First Embodiment of Braking Control Device

Figure 1:
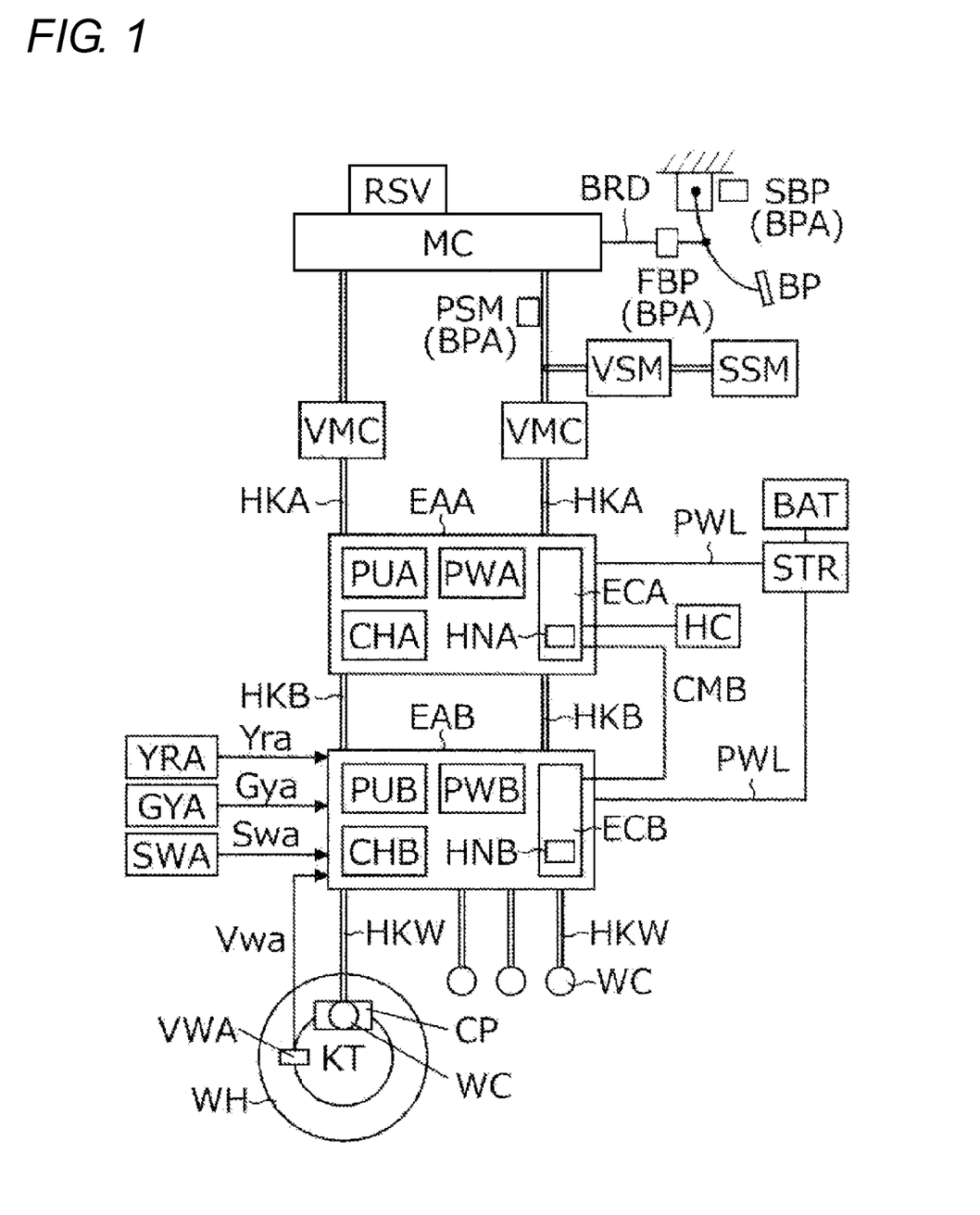
FIG. 1 is an overall configuration diagram for describing a first embodiment of a braking control device for a vehicle according to the present invention.

A first embodiment of a braking control device according to the present invention will be described with reference to an overall configuration diagram of FIG. 1. In the following description, constituent members denoted by the same symbols, calculation process, signals, characteristics, and values are of the same function. Therefore, redundant explanation may be omitted.

The vehicle includes two different fluid pressure units EAA and EAB. In addition to the first and second fluid pressure units EAA, EAB, the vehicle includes a braking operation member BP, an operation amount sensor BPA (collective term of operational displacement sensor SBP, operation force sensor FBP, simulator fluid pressure sensor PSM), a master cylinder MC, a stroke simulator SSM, a simulator shutoff valve VSM, a master cylinder shutoff valve VMC, fluid path (brake pipings) HKA, HKB, HKW, and a notifying device HC. Furthermore, each wheel WH of the vehicle is provided with a brake caliper CP, a wheel cylinder WC, a rotating member KT, and a friction member.

The braking operation member (e.g., brake pedal) BP is a member operated by the driver to decelerate the vehicle. The braking torque of the wheel WH is adjusted, and the braking force is generated at the wheel WH by operating the braking operation member BP. Specifically, a rotating member (e.g., brake disc) KT is fixed to the wheel WH of the vehicle. The brake caliper CP is arranged so as to sandwich the rotating member KT. In the brake caliper (also simply referred to as caliper) CP, a wheel cylinder WC is provided. As the pressure Pwc of the brake fluid in the wheel cylinder WC is increased, a friction member (e.g., brake pad) is pressed against the rotating member KT. Since the rotating member KT and the wheel WH are fixed so as to rotate integrally, a braking torque (braking force) is generated at the wheel WH by the frictional force generated at this time. As the caliper CP, a floating type caliper or an opposing type caliper can be adopted.

On the braking operation member BP, an operational displacement sensor SBP is provided so as to detect the operational displacement Sbp. A state variable related to "displacement" of the braking operation member BP is detected as the operational displacement Sbp. In other words, the operational displacement sensor SBP detects the "state quantity related to displacement" as the operational displacement Sbp. For example, in the braking operation member BP rotatably fixed to a vehicle body, a rotation angle of the braking operation member BP with respect to the vehicle body is detected as the operational displacement Sbp. In this case, the operational displacement sensor SBP is a rotation angle sensor. Furthermore, a displacement of a brake rod BRD mechanically connecting the braking operation member BP and a piston in the master cylinder MC with respect to the vehicle body can be detected as the operational displacement Sbp. In this case, the operational displacement sensor SBP is a linear displacement sensor.

The braking operation member BP is provided with an operation force sensor FBP so as to detect an operation force Fbp. A state variable related to "force" of the braking operation member BP is detected as the operation force Fbp. In other words, the operation force sensor FBP detects the "state quantity related to force" as the operation force Fbp. For example, in a case where the braking operation member BP is a brake pedal operated by foot, the pedaling force is detected as the operation force Fbp by a pedaling force sensor FBP. Furthermore, the fluid pressure Psm in a simulator SSM (i.e., in master cylinder MC) can be detected as the operation force Fbp. In this case, the operation force sensor FBP is a pressure sensor PSM.

The operational displacement sensor SBP and the operation force sensor FBP are collectively referred to as an operation amount sensor BPA. Furthermore, the operational displacement Sbp and the operation force Fbp are referred to as an operation amount Bpa. The detected braking operation amount Bpa is input to the first and second fluid pressure units EAA, EAB (in particular, first and second controllers ECA, ECB).

A tandem master cylinder (also simply referred to as master cylinder) MC is connected to the braking operation member BP by way of a piston rod BRD. The operation force (e.g., brake pedal pedaling force) of the braking operation member BP is converted into the pressure of the brake fluid by the master cylinder MC. A fluid path (master cylinder piping) HKA is connected to the master cylinder MC, where if the braking operation member BP is operated, the brake fluid is discharged (pressure-fed) from the master cylinder MC to the fluid path HKA.

A stroke simulator (also simply referred to as a simulator) SSM is provided to cause the braking operation member BP to generate an operation force. A simulator shutoff valve VSM is provided between a fluid pressure chamber in the master cylinder MC and the simulator SSM. The simulator shutoff valve VSM is a two-position electromagnetic valve having an open position and a closed position. When the simulator shutoff valve VSM is at the open position, the master cylinder MC and the simulator SSM are in a communicating state. On the other hand, when the simulator shutoff valve VSM is at the closed position, the master cylinder MC and the simulator SSM are in a shutoff state (non-communicating state). A normally closed electromagnetic valve (NC valve) can be adopted as the simulator shutoff valve VSM.

A piston and an elastic body (e.g., a compression spring) are provided inside the simulator SSM. The brake fluid is moved from the master cylinder MC into the simulator SSM, and the piston is pushed by the flowing brake fluid. A force is imparted to the piston in a direction of inhibiting the inflow of the brake fluid by the elastic body. An operation force (e.g., brake pedal pedaling force) Fbp in the case where the braking operation member BP is operated is formed by the elastic body.

A simulator fluid pressure sensor PSM is provided so as to detect the simulator fluid pressure Psm as the operation force Fbp. The simulator fluid pressure sensor PSM is one of the operation force sensors FBP and is an operation amount sensor BPA (collective term). The simulator fluid pressure Psm is input to the first controller ECA of the first fluid pressure unit EAA.

A master cylinder shutoff valve VMC is provided in a fluid path (master cylinder piping) HKA that connects the master cylinder MC and the wheel cylinder WC. The master cylinder shutoff valve VMC is a two-position electromagnetic valve having an open position and a closed position. When the master cylinder shutoff valve VMC is at the open position, the master cylinder MC and the wheel cylinder WC are in a communicating state. On the other hand, when the master cylinder shutoff valve VMC is at the closed position, the master cylinder MC and the wheel cylinder WC are in a shutoff state (non-communicating state). A normally opened electromagnetic valve (NO valve) can be adopted as the master cylinder shutoff valve VMC.

First Fluid Pressure Unit EAA

In place of the master cylinder MC, the first fluid pressure unit EAA causes the wheel cylinder WC provided in the four wheels WH of the vehicle to generate the fluid pressure Pwc. When the first fluid pressure unit EAA is operated, the master cylinder shutoff valve VMC is placed at the closed position, and movement of the brake fluid from the master cylinder MC to the wheel cylinder WC is inhibited. In this case, the simulator shutoff valve VSM is at the open position, and thus the brake fluid from the master cylinder MC is moved to the simulator SSM. The first fluid pressure unit EAA is a braking control device having a so-called brake-by-wire configuration. The first fluid pressure unit EAA is configured by a first power source PUA, a first pressure regulating mechanism CHA, a first fluid pressure sensor PWA, and a first controller (electronic control unit) ECA.

In the first power source PUA, the pressure of the brake fluid is generated using power other than muscle strength of the driver as a power source. For example, the first power source PUA is a hydraulic pump driven by an electric motor. In this case, the fluid pressure generated by the hydraulic pump can be stored and used in the pressure accumulator. Furthermore, a fluid cylinder (electric cylinder) driven by the electric motor can be adopted as the first power source PUA. Specifically, the rotational power of the electric motor is converted into a linear power by a power conversion mechanism (e.g., a screw mechanism), whereby the piston in the electric cylinder is pressed, and pressure is generated in the brake fluid.

The fluid pressure generated by the first power source PUA is controlled to a desired fluid pressure by the first pressure regulating mechanism CHA. The first pressure regulating mechanism CHA is controlled by the first controller ECA. For example, the first pressure regulating mechanism CHA is configured by a linear electromagnetic valve. Specifically, the high pressure stored in the pressure accumulator is regulated by the linear electromagnetic valve, and is output from the first pressure regulating mechanism CHA. In the case where the electric cylinder is adopted as the first power source PUA, the first power source PUA functions as the first pressure regulating mechanism CHA. Specifically, fluid pressure control is performed by adjusting the output of the electric motor of the electric cylinder. Therefore, the electric cylinder operates as the first power source PUA and the first pressure regulating mechanism CHA. The first fluid pressure unit EAA (i.e., first pressure regulating mechanism CHA) is fluidly connected to the second fluid pressure unit EAB by way of a fluid path HKB.

The pressure regulation result Pwa of the first pressure regulating mechanism CHA is detected by the first fluid pressure sensor PWA. That is, the first fluid pressure sensor PWA detects the output fluid pressure Pwa of the first fluid pressure unit EAA (in particular, first pressure regulating mechanism CHA). The output fluid pressure Pwa is input to the first controller ECA.

The first power source PUA and the first pressure regulating mechanism CHA are controlled by the first controller (electronic control unit) ECA. In the first controller ECA, signals for controlling the electromagnetic valves VSM, VMC are calculated and outputted. The first controller ECA is configured by a control algorithm programmed in the microprocessor and an electric circuit (drive circuit) that drives the electric motor and the electromagnetic valve according to the algorithm. Furthermore, the first controller ECA is connected to the second controller ECB of the second fluid pressure unit EAB through a communication bus CMB (e.g., serial communication bus) in a state where signal transmission with the second controller ECB can be carried out. For example, a CAN (Controller Area Network) may be adopted as the communication bus CMB.

In the control algorithm programmed in the first controller ECA, a target fluid pressure Pwt is calculated based on the braking operation amount Bpa (i.e., at least one of operational displacement Sbp and operation force Fbp) and the suitability characteristic CHgo. The target fluid pressure Pwt is a target value of the output fluid pressure of the first fluid pressure unit EAA. The suitability characteristic CHgo is a preset calculation map for determining the target fluid pressure Pwt in a case where the device suitably operates. In the suitability characteristic CHgo, the target fluid pressure Pwt is determined to be "0" when the operation amount Bpa is greater than or equal to "0" or smaller than a predetermined value bpo, and the target fluid pressure Pwt is calculated to monotonically increase (see FIG. 3) as the operation amount Bpa increases when the operation amount Bpa is greater than or equal to a predetermined value bpo. Here, the predetermined value bpo is a value equivalent to the play of the braking operation member BP.

When the operation amount Bpa becomes greater than or equal to the predetermined value bpo, the first controller ECA outputs a drive signal for having the simulator shutoff valve VSM at the open position and outputs a drive signal for having the master cylinder shutoff valve VMC at the closed position. With these signals, the master cylinder MC is brought into communication with the simulator SSM, and the first fluid pressure unit EAA is brought into communication with the wheel cylinder WC.

The first power source PUA and the electric motor (for driving hydraulic pump or for electric cylinder) constituting the first pressure regulating mechanism CHA, and the linear electromagnetic valve are controlled based on the fluid pressure target value Pwt calculated by the first controller ECA. Specifically, the target value of the energization amount of the electric motor and the linear electromagnetic valve is determined based on the target fluid pressure Pwt. The energization state to the electric motor and the linear electromagnetic valve is adjusted through the drive circuit based on such target values. In addition, the fluid pressure feedback control is executed based on the fluid pressure actual value Pwa (detected value of fluid pressure sensor PWA). Specifically, a deviation ePw between the target value Pwt of the brake fluid pressure and the actual value Pwa is calculated, and fine adjustment of the energization state (e.g., current value) is performed based on the deviation ePw. High-precision fluid pressure control is performed by PID control based on the so-called fluid pressure deviation ePw so that the actual value Pwa matches the target value Pwt.

In the first controller ECA, a determination processing block HNA (equivalent to determining means) for determining the appropriateness of the operating state of the first fluid pressure unit EAA is formed. In the first determining means HNA, "whether or not the first fluid pressure unit EAA is in a suitable state". When the first fluid pressure unit EAA is in a suitable state, "0 (zero)" is output to the second fluid pressure unit EAB through the communication bus CMB as a first determination result (determination flag) Hna. On the other hand, when the first fluid pressure unit EAA is not in the suitable state (i.e., in non-suitable state), "1" is output to the second fluid pressure unit EAB through the communication bus CMB as the determination flag Hna.

The first determining means HNA is an arithmetic algorithm, and is programmed in the microcomputer of the first controller ECA. The first determining means HNA determines the appropriateness of the operating state of the first power source PUA, the first pressure regulating mechanism CHA, and the first fluid pressure sensor PWA. For example, the energization state to the electric motor, the electromagnetic valve and the like is monitored by a current sensor or the like, and the appropriateness of the operating state of such configuring elements is determined.

The first determining means HNA executes an initial diagnosis of the first fluid pressure unit EAA when the power train (engine or electric motor for driving) of the vehicle is started by a start switch STR (i.e., at the time of starting). In the initial diagnosis, the state of power supply to the first fluid pressure unit EAA, the diagnosis of the first controller ECA itself (e.g., memory diagnosis), the confirmation of operation of the communication state via the electric motor, the electromagnetic valve, the drive circuit, various sensors (first fluid pressure sensor PWA, current sensors, etc.) and the communication bus CMB are executed. The first fluid pressure unit EAA has been described above.

Second Fluid Pressure Unit EAB

In the vehicle, a second fluid pressure unit EAB is provided separately from the first fluid pressure unit EAA. That is, two fluid pressure units EAA, EAB are provided in the vehicle. The second fluid pressure unit EAB is provided in a fluid path between the first fluid pressure unit EAA and the wheel cylinder WC. A fluid path HKB between the first fluid pressure unit EAA and the second fluid pressure unit EAB is a pressure regulating piping, and a fluid path HKW between the second fluid pressure unit EAB and the wheel cylinder WC is a wheel cylinder piping. That is, the first fluid pressure unit EAA and the second fluid pressure unit EAB are arranged in series with respect to the wheel cylinder WC.

The second fluid pressure unit EAB regulates the fluid pressure Pwc of the wheel cylinder WC of each wheel WH independently of the driver's braking operation based on the turning state of the vehicle. Accordingly, the fluid pressure (i.e., output fluid pressure Pwa) generated by the first fluid pressure unit EAA is regulated by the second fluid pressure unit EAB, and the final wheel cylinder fluid pressure Pwc is generated. The second fluid pressure unit EAB is a fluid pressure unit for a so-called electronic stability control (ESC).

Similar to the first fluid pressure unit EAA, the second fluid pressure unit EAB is configured by a second power source PUB, a second pressure regulating mechanism CHB, a second fluid pressure sensor PWB, and a second controller (electronic control unit) ECB. The pressure of the brake fluid is generated by the second power source PUB that is separate from the first power source PUA. For example, the second power source PUB is a hydraulic pump driven by an electric motor.

The fluid pressure generated by the second power source PUB is controlled to a desired fluid pressure by the second pressure regulating mechanism CHB. The second power source PUB, and the second pressure regulating mechanism CHB are controlled by the second controller ECB. For example, the second pressure regulating mechanism CHB is configured by a linear electromagnetic valve. The fluid pressure is increased by the hydraulic pump driven by the electric motor, and the fluid pressure is regulated by a differential pressure valve (electromagnetic valve). Furthermore, the fluid pressure Pwc in the wheel cylinder WC of each wheel WH is independently regulated by a combination of a pressure increasing electromagnetic valve and a pressure reducing electromagnetic valve.

Similar to the first controller ECA, the second controller ECB of the second fluid pressure unit EAB is configured by a control algorithm programmed in the microprocessor, and an electric circuit (drive circuit) that drives the electric motor and the electromagnetic valve according to the algorithm.

The second controller ECB receives a yaw rate Yra from a yaw rate sensor YRA, a lateral acceleration Gya from a lateral acceleration sensor GYA, a steering angle Swa from an operation angle sensor SWA, and a wheel speed Vwa from a wheel speed sensor VWA. To execute vehicle stability control (control to suppress excessive understeer and oversteer based on yaw rate Yra etc.), anti-skid control (control to suppress wheel lock based on wheel speed Vwa etc.), and the like based on the signals (Yra, Vwa, etc.), the target value Pwt of the brake fluid pressure (fluid pressure in wheel cylinder WC) is calculated in each wheel WH. Then, the wheel cylinder fluid pressure Pwc is regulated so that the target value Pwt is achieved.

In the second fluid pressure unit EAB, the fluid pressure regulation of the wheel cylinder WC is executed according to the operation amount Bpa (at least one of operational displacement Sbp and operation force Fbp) of the braking operation member BP when the first fluid pressure unit EAA is in a malfunctioning state in addition to executing the vehicle stability control and the like. The second fluid pressure unit EAB is provided with the second power source PUB and the second pressure regulating mechanism CHB different from the first fluid pressure unit EAA.

At least one of the operational displacement Sbp and the operation force Fbp is input (i.e., operation amount Bpa is input) to the second controller ECB. Furthermore, the first controller ECA transmits the first determination result Hna to the second controller ECB through the communication bus CMB (e.g., serial communication bus). In a case where the first determination result Hna indicates a suitable state (i.e., "Hna=0"), the second fluid pressure unit EAB does not execute the pressure regulating control according to the operation amount Bpa. However, when the first determination result Hna indicates a non-suitable state (i.e., "Hna=1"), the second fluid pressure unit EAB increases the fluid pressure Pwc in the wheel cylinder WC in place of the first fluid pressure unit EAA based on the braking operation amount Bpa. The brake fluid pressure control by the second fluid pressure unit EAB in a malfunctioning state of the first fluid pressure unit EAA is referred to as "substitution control". When the substitution control is executed in the second fluid pressure unit EAB, the operation of the first fluid pressure unit EAA is stopped.

In the second controller ECB of the second fluid pressure unit EAB, characteristic (calculation map) for executing substitution control is stored. The characteristic is the relationship of the wheel cylinder fluid pressure Pwc with respect to the operation amount Bpa (result, relation of vehicle deceleration Gxa with respect to operation amount Bpa) and is referred to as "substitution characteristic". The substitution characteristic is set in advance in the second fluid pressure unit EAB (particularly in second controller ECB) so as to ensure that the driver notices the malfunction of the device although it does not give a discomfort to the driver. Specifically, the substitution characteristic is set so that the characteristic changes based on at least one of a value equivalent to the braking operation amount Bpa (equivalent to Bpa, Gxa, Pwc, collectively referred to as operation equivalent value), a state of increase/decrease of the operation amount Bpa, and a number of repetitions NKR of a series of braking operations. Details of the substitution characteristic will be described later.

Similar to the first determining means (first determination calculating unit) HNA of the first controller ECA, the second determining means (second determination calculating unit) HNB is formed in the second controller ECB. The appropriateness of the operating state of the second fluid pressure unit EAB is determined in the second determining means HNB (equivalent to determining means) according to the method similar to the first determining means HNA. In addition, whether or not the operating state of the first fluid pressure unit EAA is in a suitable state is determined by the second determining means HNB. The second determining means HNB acquires a signal related to the operating state of the first fluid pressure unit EAA through the communication bus CMB and determines the appropriateness of the first fluid pressure unit EAA based on the signal. The second fluid pressure unit EAB has been described above.

From the second fluid pressure unit EAB (in particular, first pressure regulating mechanism CHA), the discharge and inflow of the brake fluid regulated with each wheel cylinder WC are carried out through the fluid path (wheel cylinder piping) HKW. The piston in the wheel cylinder WC moves (forward or backward) with respect to the rotating member KT, and the braking force of the wheel WH is regulated (increased, or decreased) by regulating the fluid pressure Pwc in the wheel cylinder WC of the caliper CP.

The vehicle is provided with a notifying device HC. When the first fluid pressure unit EAA is in a non-suitable state, this is notified to the driver by the notifying device HC. For example, the notifying device HC notifies the driver of the non-suitable state of the device by sound, light, or the like.

Setting Process of Substitution Characteristic

Figure 2:
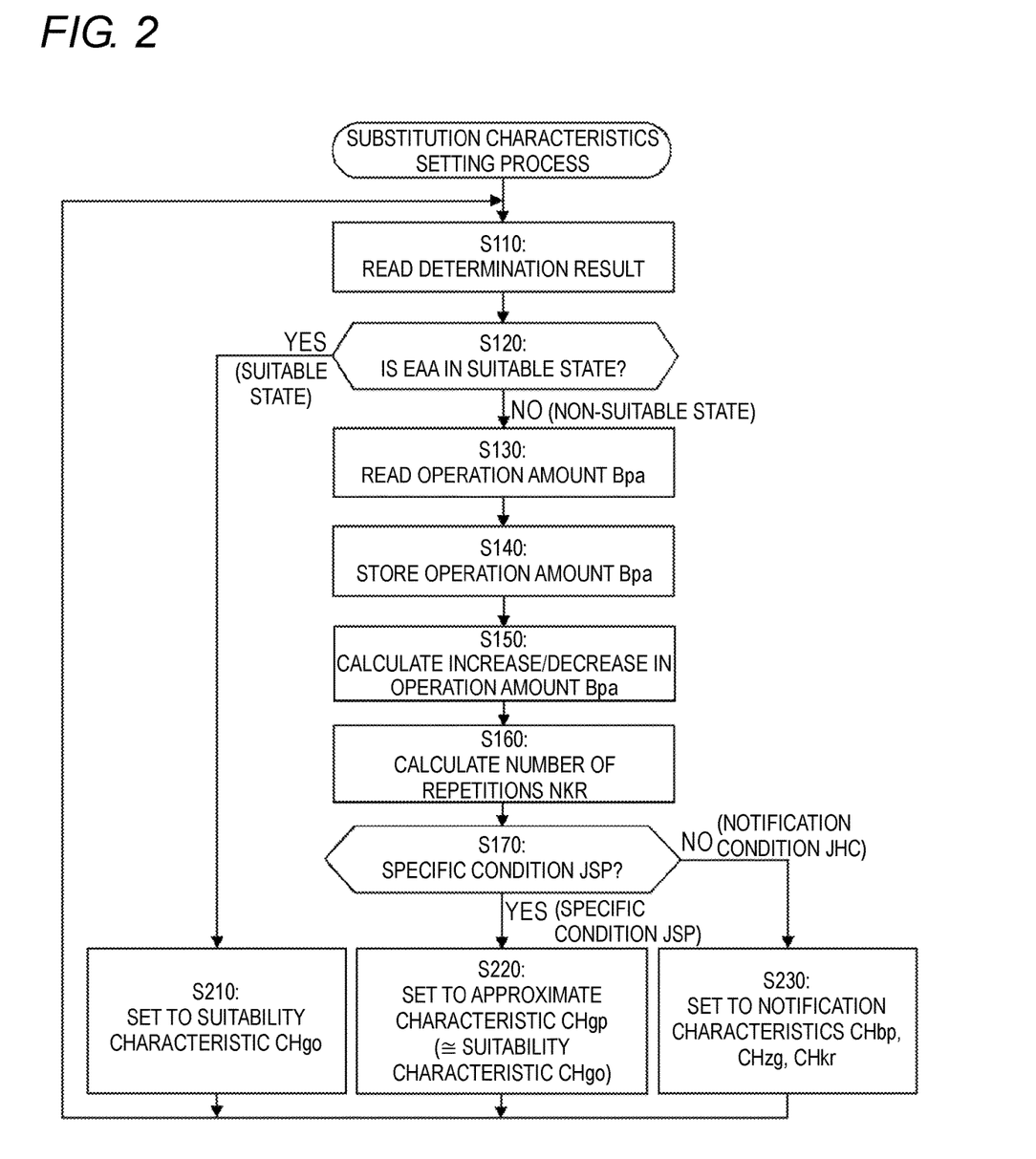
FIG. 2 is a flowchart for explaining a setting process of a substitution characteristic.

A setting process of the operation characteristics (substitution characteristics) in the substitution control will be described with reference to the flowchart of FIG. 2. Here, in the substitution control, when the first fluid pressure unit EAA (pressurization device for normal braking) malfunctions, the operation of the first fluid pressure unit EAA is stopped and the wheel cylinder fluid pressure Pwc is increased according to the operation amount Bpa by the second fluid pressure unit EAB (pressurization device for vehicle stability control). The operation characteristics (brake fluid pressure Pwc with respect to operation amount Bpa, consequently, vehicle deceleration Gxa) when the substitution control is executed are the substitution characteristics. The substitution characteristic is composed of two kinds of characteristics (approximate characteristic CHgp and notification characteristics CHbp, CHzg, CHkr).

First, in step S110, the appropriateness determination result (Hna etc.) of the first fluid pressure unit EAA is read. The process proceeds to step S120, and "whether or not the operation of the first fluid pressure unit EAA is in a suitable state" is determined based on the determination result. When the first fluid pressure unit EAA is in a suitable state and the result in step S120 is affirmative ("YES"), the process proceeds to step S210. On the other hand, when the first fluid pressure unit EAA is in a non-suitable state and the result in step S120 is negative ("NO"), the process proceeds to step S130.

In step S130, the braking operation amount Bpa (collective term of the operational displacement Sbp, the operation force Fbp) is read. In step S140, the operation amount Bpa is stored.

In step S150, which one of the increase, maintenance, and decrease is the operation amount Bpa is calculated. Specifically, a time change amount dBp of the operation amount Bpa (i.e., time differential value of operation amount Bpa) is calculated based on the operation amount Bpa in the present calculation cycle and the stored operation amount Bpa. The operation amount Bpa is increasing when the operation change amount dBp is larger than "0" (i.e., operation change amount dBp is positive value), and the operation amount Bpa is maintained at a constant value when the operation change amount dBp is "0" (i.e., "dBp=0"). Furthermore, the operation amount Bpa is decreasing when the operation change amount dBp is smaller than "0" (i.e., operation change amount dBp is negative value).

In step S160, the number of repetitions NKR of the operation of the braking operation member BP is calculated in a series of operations of the braking operation member BP on the basis of the operation amount Bpa in the present calculation cycle and the stored operation amount Bpa. Here, the "series of operations" means from the start of the operation to the end of the operation. Therefore, when the operation amount Bpa increases from "0", decreases, and returns to "0" again, "one time" of the braking operation is counted at this time point. The number of repetition NKR is a value indicating "which number of braking operation" is present (now) calculation cycle from the time point when the malfunctioning state of the first fluid pressure unit EAA is detected for the first time (i.e., calculation cycle that transitioned from the suitable state to the non-suitable state).

In step S170, "whether or not the specific condition JSP" is determined based on at least one of the magnitude of the operation amount Bpa, the increase/decrease state of the operation amount Bpa, and the number of repetitions NKR. Here, the "specific condition JSP" is a condition for selecting one of two types of substitution characteristics. When the specific condition JSP is satisfied, the approximate characteristic CHgp (characteristic substantially matching suitability characteristic CHgo) to be described later is selected as the calculation map of the operation characteristic. On the other hand, when the specific condition JSP is not satisfied (i.e., referred to as "notification condition JHC"), the notification characteristics CHbp, CHzg, and CHkr different from the suitability characteristic CHgo are selected as the calculation map of the operation characteristic.

In step S170, "whether or not the specific condition JSP" is determined based on "whether or not the operation amount Bpa is smaller than a predetermined amount bpx". When "Bpa<bpx" and the result in step S170 is affirmative ("YES"), the process proceeds to step S220. On the other hand, when "Bpa≥bpx" and the result in step S170 is negative ("NO"), the process proceeds to step S230. Here, the predetermined amount bpx is a threshold value for determination set in advance. For example, the predetermined amount bpx can be set as a value equivalent to a general braking state of "0.3 to 0.4 [G]" in the deceleration Gxa of the vehicle.

Furthermore, in step S170, "whether or not the specific condition JSP" is determined based on "whether or not the operation amount Bpa is increasing". When "dBp>0 (increasing)" and the result in step S170 is affirmative ("YES"), the process proceeds to step S220. On the other hand, when "dBp≤0 (maintaining or decreasing)" and the result in step S170 is negative ("NO"), the process proceeds to step S230.

Furthermore, in step S170, "whether or not the specific condition JSP" is determined based on "whether or not the number of repetitions NKR is less than a predetermined number of times nkx". When "NKR<nkx" is satisfied and the result in step S170 is affirmative ("YES"), the process proceeds to step S220. On the other hand, when "NKR≥nkx" and the result in step S170 is negative ("NO"), the process proceeds to step S230. Here, the predetermined number of times nkx is a threshold value for determination set in advance.

In step S210, the suitability characteristic CHgo in the case where the first fluid pressure unit EAA is in a suitable state is set. The suitability characteristic CHgo is a relationship between the braking operation amount Bpa and the brake fluid pressure Pwc in a case where the device is operating appropriately (time of normal braking). The suitability characteristic CHgo is set in advance in the first fluid pressure unit EAA. Then, the first fluid pressure unit EAA is controlled based on the suitability characteristic CHgo. At this time, the second fluid pressure unit EAB is stopped unless the vehicle stability control or the like is executed.

In step S220, since the specific condition JSP is satisfied, the approximate characteristic CHgp is set as the substitution characteristic (calculation characteristic in the substitution control). The approximate characteristic CHgp substantially matches the suitability characteristic CHgo so as not to give discomfort to the driver. The approximate characteristic CHgp is set in advance in the second fluid pressure unit EAB.

In step S230, the first, second, and third notification characteristics CHbp, CHzg, CHkr are set as substitution characteristics (in the case of notification condition JHC). The notification characteristics CHbp, CHzg, CHkr are set differently from the suitability characteristic CHgo in order to inform the driver of the malfunction of the device. The notification characteristics CHbp, CHzg, CHkr are preset in the second fluid pressure unit EAB.

Here, the first notification characteristic CHbp is selected based on "whether or not the operation amount Bpa is smaller than the predetermined amount bpx". The second notification characteristic CHzg is selected based on "whether or not the operation amount Bpa is increasing". The third notification characteristic CHkr is selected based on "whether or not the number of repetitions NKR is smaller than the predetermined number nkx". In the determination of step S170, the three conditions described above can be combined. That is, in step S170, determination on "whether or not the specific condition JSP" is made based on at least one of the three conditions. Details of the notification characteristics CHbp, CHzg, CHkr will be described later.

In the braking control device, when the first fluid pressure unit EAA is in a malfunctioning state, any one of the approximate characteristic CHgp and the notification characteristics (CHbp, etc.) is set as the substitution characteristic (calculation map of the substitution control). Then, the second fluid pressure unit EAB is controlled based on the substitution characteristic. At this time, the first fluid pressure unit EAA is stopped.

At the time of normal braking, the brake fluid pressure Pwc is regulated through the first fluid pressure unit EAA according to the suitability characteristic CHgo (calculation map stored in the first controller ECA) corresponding to the operation of the braking operation member BP. However, when the first fluid pressure unit EAA malfunctions, the brake fluid pressure Pwc is not increased only by the master cylinder MC, and the brake fluid pressure Pwc is increased through the second fluid pressure unit EAB according to the alternate characteristics CHgp, CHbp, CHzg, and CHkr (calculation map stored in the second controller ECB) corresponding to the operation of the braking operation member BP. The second fluid pressure unit EAB is not newly provided for fail-safe but is existing for brake control such as vehicle stability control. Therefore, it is possible to deal with the malfunction of the first fluid pressure unit EAA without providing an additional device.

Furthermore, the substitution characteristic is formed of two types, that is, the approximate characteristic CHgp that does not give the driver a feeling of discomfort, and the notification characteristics CHbp, CHzg, and CHkr that notifies the driver of the device malfunction through the operation characteristics. The device malfunction can be reliably notified without giving a feeling of discomfort to the driver by appropriately selecting the above.

In step S170, the determination of the specific condition JSP can be made based on a value (referred to as operation equivalent value) equivalent to the operation amount Bpa instead of the operation amount Bpa. The operation equivalent value is a value in the power transmission path from the operation amount Bpa to the vehicle deceleration Gxa. For example, the operation amount Bpa itself, the brake fluid pressure Pwc, and the vehicle deceleration Gxa correspond to the operation equivalent value. The case where the operation equivalent value is smaller than the predetermined amount bpx is the specific condition JSP and the approximate characteristic CHgp is adopted as the substitution characteristic. On the other hand, the case where the operation equivalent value is greater than or equal to the predetermined amount bpx is the notification condition JHC, and the notification characteristic CHbp is adopted as the substitution characteristic.

First Setting Example of Substitution Characteristics

Figure 3:
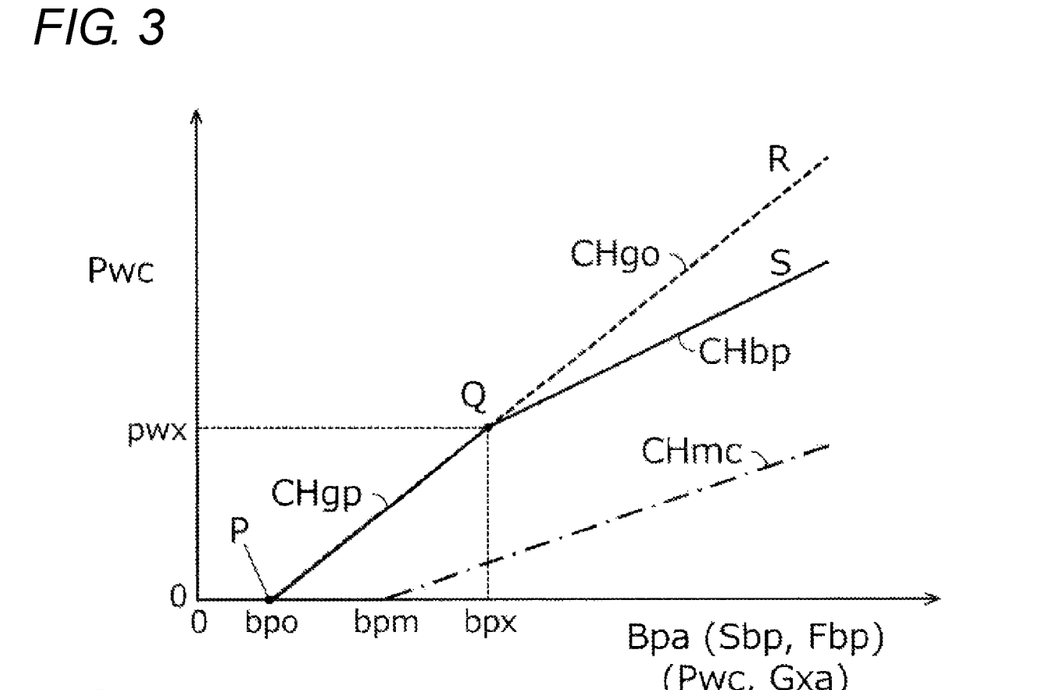
FIG. 3 is a characteristic diagram for explaining a first setting example of the substitution characteristics.

A first setting example of the substitution characteristic will be described with reference to the characteristic diagram of FIG. 3. In the first setting example, the specific condition JSP of the substitution control is determined based on the operation equivalent value (Bpa etc.).

When the operation of the first fluid pressure unit EAA is in a suitable state, the suitability characteristic CHgo (see broken line) is set as the calculation map for the first fluid pressure unit EAA. In the suitability characteristic CHgo, the brake fluid pressure Pwc (fluid pressure in the wheel cylinder WC) is set to maintain "0" from the braking operation amount Bpa of "0" to the predetermined value bpo, and the brake fluid pressure Pwc is set to monotonically increase from "0" (see characteristic P-Q-R) as the operation amount Bpa increases from the predetermined value bpo. Here, the predetermined value bpo is a preset predetermined value equivalent to the play of the braking operation member BP.

When the operation of the first fluid pressure unit EAA is in a non-suitable state, the notifying device HC notifies the driver that the first fluid pressure unit EAA is not suitable. In addition, substitution control is executed by the second fluid pressure unit EAB. In the substitution control, the brake fluid pressure Pwc is increased by the second fluid pressure unit EAB in place of the first fluid pressure unit EAA. In the substitution control, the operation characteristic (brake fluid pressure characteristic with respect to the operation amount Bpa) is changed from the suitability characteristic CHgo to the substitution characteristic CHgp, CHbp.

The substitution characteristic is configured by two characteristics, the approximate characteristic CHgp corresponding to the specific condition JSP and the first notification characteristic CHbp corresponding to the notification condition JHC (condition when the specific condition JSP is denied). In the substitution characteristic, the case where the braking operation amount Bpa is adopted will be described as an example as the operation equivalent value.

The case where the operation amount Bpa is "0" to smaller than the predetermined amount bpx satisfies the specific condition JSP. In the specific condition JSP, the substitution characteristic is set to the approximate characteristic CHgp proximate to the suitability characteristic CHgo. In FIG. 3, the approximate characteristic CHgp substantially matches and overlaps with the suitability characteristic CHgo. Specifically, in the approximate characteristic CHgp, the brake fluid pressure Pwc (fluid pressure in the wheel cylinder WC) is set to maintain "0" from the operation amount Bpa of "0" to the predetermined value bpo, and the brake fluid pressure Pwc is set to monotonically increase from "0" (see characteristic P-Q) as the operation amount Bpa increases from the predetermined value bpo.

The case where the operation amount Bpa is greater than or equal to the predetermined amount bpx is the notification condition JHC (when the specific condition JSP is unsatisfactory). In the notification condition JHC, the substitution characteristic is set to the first notification characteristic CHbp completely different from the suitability characteristic CHgo. The device malfunction is notified to the driver by the change in the operation characteristic caused by the first notification characteristic CHbp.

Specifically, when the operation amount Bpa is greater than or equal to the predetermined amount bpx, the brake fluid pressure Pwc monotonically increases as the operation amount Bpa increases, but the increase amount (i.e., fluid pressure increase gradient) of the brake fluid pressure Pwc with respect to the increase in the operation amount Bpa is made smaller than the suitability characteristic CHgo (see characteristic Q-S). Therefore, in the first notification characteristic CHbp, the brake fluid pressure Pwc is determined to be small compared with the suitability characteristic CHgo with respect to the same operation amount Bpa. As a result, the vehicle deceleration Gxa is less likely to be generated, compared with the time of normal braking, at the time of malfunction of the first fluid pressure unit EAA even with the same operation amount Bpa. In addition to the notification by the notifying device HC, the driver is able to notice the malfunction of the braking control device by such difference.

The approximate characteristic CHgp and the first notification characteristic CHbp are made continuous at point Q (predetermined amount bpx, predetermined fluid pressure pwx). Therefore, the discontinuous feeling is not given to the driver even when transitioned from the approximate characteristic CHgp to the first notification characteristic CHbp in accordance with the increase in the operation amount Bpa.

In the first notification characteristic CHbp, it is set as a characteristic smaller than the suitability characteristic CHgo (i.e., calculation map in which a small brake fluid pressure Pwc is determined with the same operation amount Bpa). In order to notify the driver of the malfunction of the first fluid pressure unit EAA, it is sufficient for the first notification characteristic CHbp to be different from the suitability characteristic CHgo. That is, the first notification characteristic CHbp may be a characteristic larger than the suitability characteristic CHgo (characteristic in which the slope of the fluid pressure with respect to the operation amount Bpa is large). However, unlike the first fluid pressure unit EAA, the second fluid pressure unit EAB is adopted for vehicle stability control and the like. Therefore, the first notification characteristic CHbp is desirably set to be as a characteristic smaller than the suitability characteristic CHgo (characteristic in which the slope of the fluid pressure with respect to the operation amount Bpa is small) so as to suppress sudden change in the brake fluid pressure Pwc.

Here, the characteristic CHmc (characteristic in which the brake fluid pressure Pwc rises from the predetermined value bpm larger than the predetermined value bpo indicated with a chain dashed line) is the characteristic ("pressurization characteristic" of the master cylinder MC) of when the first fluid pressure unit EAA and the second fluid pressure unit EAB are both not operating. That is, in FIG. 1, the pressurization characteristic is when the master cylinder shutoff valve VMC is at the open position (communicating state), and the simulator shutoff valve VSM is at the closed position (non-communicating state). In this case, the brake fluid is pressure fed directly from the master cylinder MC to the wheel cylinder WC, and the pressure Pwc of the brake fluid is increased. The first notification characteristic CHbp is a characteristic smaller than the suitability characteristic CHgo (characteristic in which the slope of the fluid pressure Pwc with respect to the operation amount Bpa is small), but is set as a characteristic larger than the pressurization characteristic CHmc. Therefore, a sufficient brake fluid pressure Pwc can be secured at a small operation amount Bpa by the substitution control.

The setting and change of the substitution characteristic based on the braking operation amount Bpa have been described above. As described above, the vehicle deceleration Gxa or the brake fluid pressure Pwc can be adopted instead of the braking operation amount Bpa. The operation amount Bpa, the vehicle deceleration Gxa, and the brake fluid pressure Pwc are collectively referred to as an operation equivalent value. Therefore, the substitution characteristic is set based on the operation equivalent value. When the brake fluid pressure Pwc is adopted for condition setting, "the case where the brake fluid pressure Pwc is smaller than the predetermined fluid pressure pwx" corresponds to the specific condition JSP and "the case where the brake fluid pressure Pwc is greater than or equal to the predetermined fluid pressure pwx" corresponds to the notification condition JHC.

Second Setting Example of Substitution Characteristics

Figure 4:
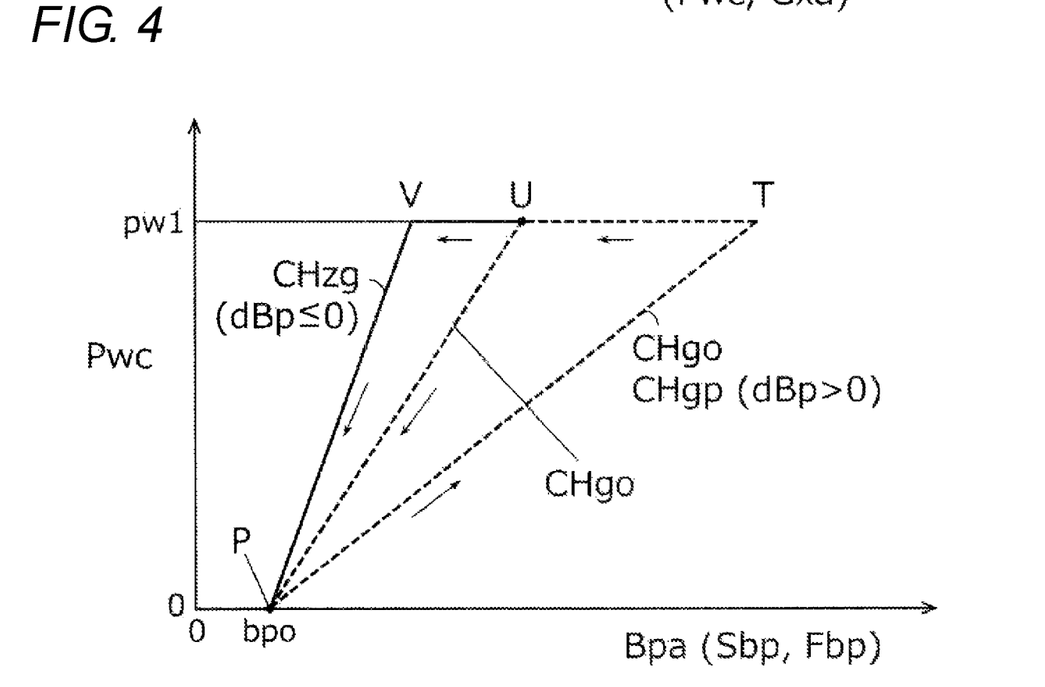
FIG. 4 is a characteristic diagram for explaining a second setting example of the substitution characteristics.

A second setting example of the substitution characteristic will be described with reference to the characteristic diagram of FIG. 4. In the second setting example, the case where the operation amount Bpa is increased corresponds to the specific condition JSP (adopting approximate characteristic CHgp), and the case where the braking operation member BP is returned and the operation amount Bpa is decreased corresponds to the notification condition JHC (adopting second notification characteristic CHzg).

In the suitability characteristic CHgo in the suitable state of the first fluid pressure unit EAA, the brake fluid pressure Pwc is increased from "0" with increase in the operation amount Bpa at "Bpa=bpo". When the operation amount Bpa is decreased, hysteresis is provided in the suitability characteristic CHgo. Specifically, when the braking operation member BP is returned to the initial position (corresponds to "Bpa=0"), the brake fluid pressure Pwc is not immediately decreased but is once maintained at the constant value pw1, and decreased toward "0". That is, the brake fluid pressure Pwc changes in the order of "P→T→U→P" as indicated by the broken line, according to the increase and decrease of the braking operation amount Bpa.

The approximate characteristic CHgp in the non-suitable state of the first fluid pressure unit EAA is adopted in the case of "dBp>0 (i.e., during increase of the operation amount Bpa)". Specifically, the approximate characteristic CHgp is a characteristic close to the suitability characteristic CHgo as described above, and in FIG. 4, is a portion of "P→T" overlapping the suitability characteristic CHgo.

In the case where the braking operation member BP is returned ("dBp≥0 (i.e., operation amount Bpa is maintained or is decreasing)"), the second notification characteristic CHzg is adopted. Unlike the suitability characteristic CHgo, the second notification characteristic CHzg is that in which the hysteresis is further enlarged. More specifically, when the operation amount Bpa decreases, the constant value pw1 is maintained to a smaller operation amount Bpa, and thereafter, the brake fluid pressure Pwc is returned to "0" in the order of "T→U→V→P" with a larger fluid pressure decrease gradient (slope of fluid pressure decrease with respect to operation amount Bpa).

Similar to the first setting example, when the first fluid pressure unit EAA malfunctions, the device malfunction is notified through the notifying device HC. When the operation amount Bpa increases, the brake fluid pressure Pwc (consequently, vehicle deceleration Gxa) is obtained similar to the time of normal braking (when first fluid pressure unit EAA is operating suitably) even if the first fluid pressure unit EAA is malfunctioning, and thus the driver does not feel discomfort. However, since the hysteresis of the brake fluid pressure Pwc with respect to the operation amount Bpa is enlarged when returning the braking operation member BP, the decrease of the vehicle deceleration Gxa slightly lags in time. Therefore, the driver can notice the malfunction of the braking control device.

Third Setting Example of Substitution Characteristics

Figure 5:
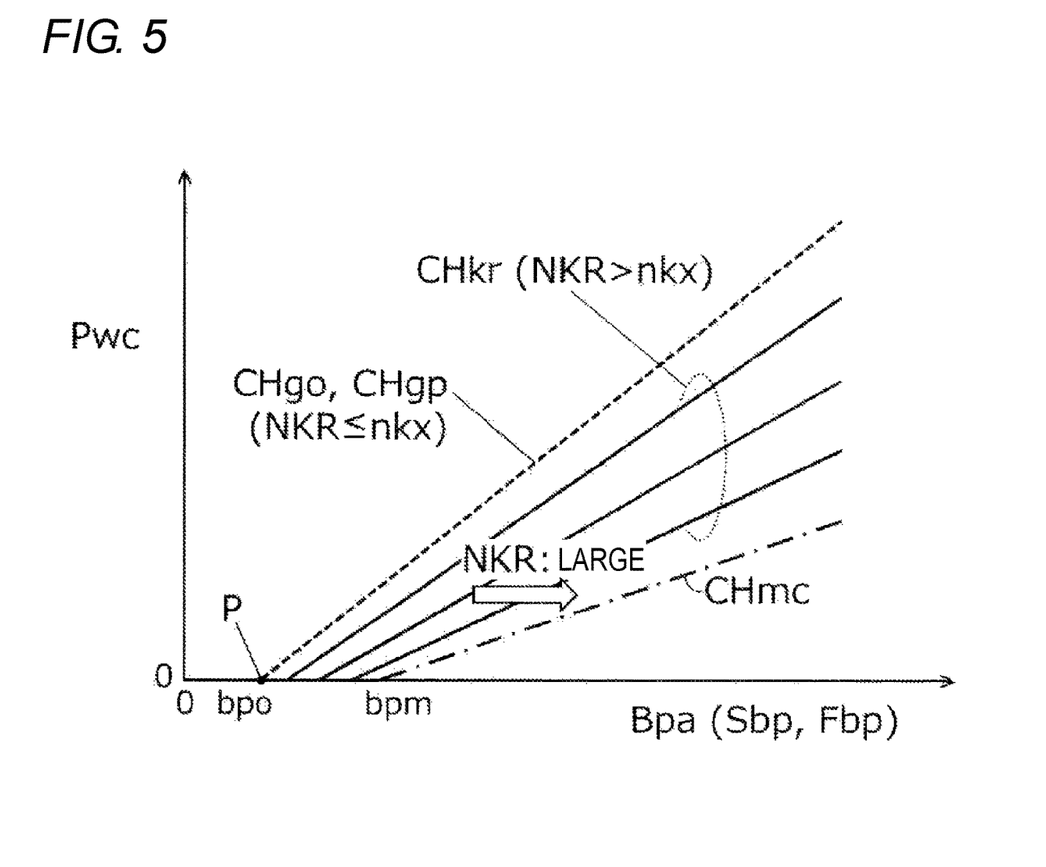
FIG. 5 is a characteristic diagram for explaining a third setting example of the substitution characteristics.

A third setting example of the substitution characteristic will be described with reference to the characteristic diagram of FIG. 5. In the third setting example, the specific condition JSP (adopting the approximate characteristic CHgp) or the notification condition JHC (adopting third notification characteristic CHkr) is determined on the basis of the number of repetitions NKR of the braking operation after detection of the malfunction of the first fluid pressure unit EAA. The number of repetitions NKR represents the number of operations (from start to finish being counted as once) of the current braking operation by counting from after the detection of the malfunction. Here, the number of repetitions NKR is calculated by having the change thereof stored and monitored based on the operation amount Bpa.

Similar to the first setting example, the suitability characteristic CHgo (see broken line) is set when the first fluid pressure unit EAA is appropriate. When the first and second fluid pressure units EAA or EAB does not operate, the operation characteristic becomes the pressurization characteristic CHmc (see chain dashed line) determined by the specifications of the master cylinder MC and the wheel cylinder WC (piston cross-sectional area etc.).

The case where the number of repetitions NKR is smaller than the predetermined number of times nkx is equivalent to the specific condition JSP. In the specific condition JSP, a characteristic similar to the suitability characteristic CHgo is set as the approximate characteristic CHgp (see broken line overlapping suitability characteristic CHgo). Here, the predetermined number of times nkx is a threshold value set in advance for determination of the specific condition.

The case where the number of repetitions NKR is greater than or equal to the predetermined number of times nkx is equivalent to the notification condition JHC. In the notification condition JHC, the third notification characteristic CHkr is set as a characteristic different from the suitability characteristic CHgo (e.g., characteristic smaller than suitability characteristic CHgo). Furthermore, the third notification characteristic CHkr can be set as a characteristic that sequentially decreases with increase in the number of repetitions NKR (i.e., calculation map in which a smaller brake fluid pressure Pwc is determined with the same operation amount Bpa). Specifically, the slope (fluid pressure gradient) of the generated fluid pressure with respect to the operation amount Bpa is gradually decreased as the number of repetitions NKR increases so that the obtained brake fluid pressure Pwc gradually decreases. Furthermore, the operation amount Bpa (fluid pressure generating operation amount) in which the brake fluid pressure Pwc rises from "0" is gradually increased from the predetermined value bpo to the predetermined value bpm (>bpo) as the number of repetitions NKR increases. That is, in the third notification characteristic CHkr, at least one of a decrease in the fluid pressure gradient and an increase in the fluid pressure generating operation amount can be adopted according to the number of repetitions NKR.

Similar to the first and second setting examples, when the first fluid pressure unit EAA malfunctions, the device malfunction is notified through the notifying device HC. When the number of repetitions NKR is small, the brake fluid pressure Pwc (consequently, vehicle deceleration Gxa) is obtained similar to the time of normal braking (when first fluid pressure unit EAA is operating suitably) even if the first fluid pressure unit EAA is malfunctioning. For this reason, the driver does not feel discomfort. However, when the number of repetitions NKR increases, the third notification characteristic CHkr is sequentially changed to a characteristic smaller than the suitability characteristic CHgo (characteristic in which the brake fluid pressure Pwc is difficult to obtain). Therefore, the driver can notice the malfunction of the braking control device.

Second Embodiment of Braking Control Device

Figure 6:
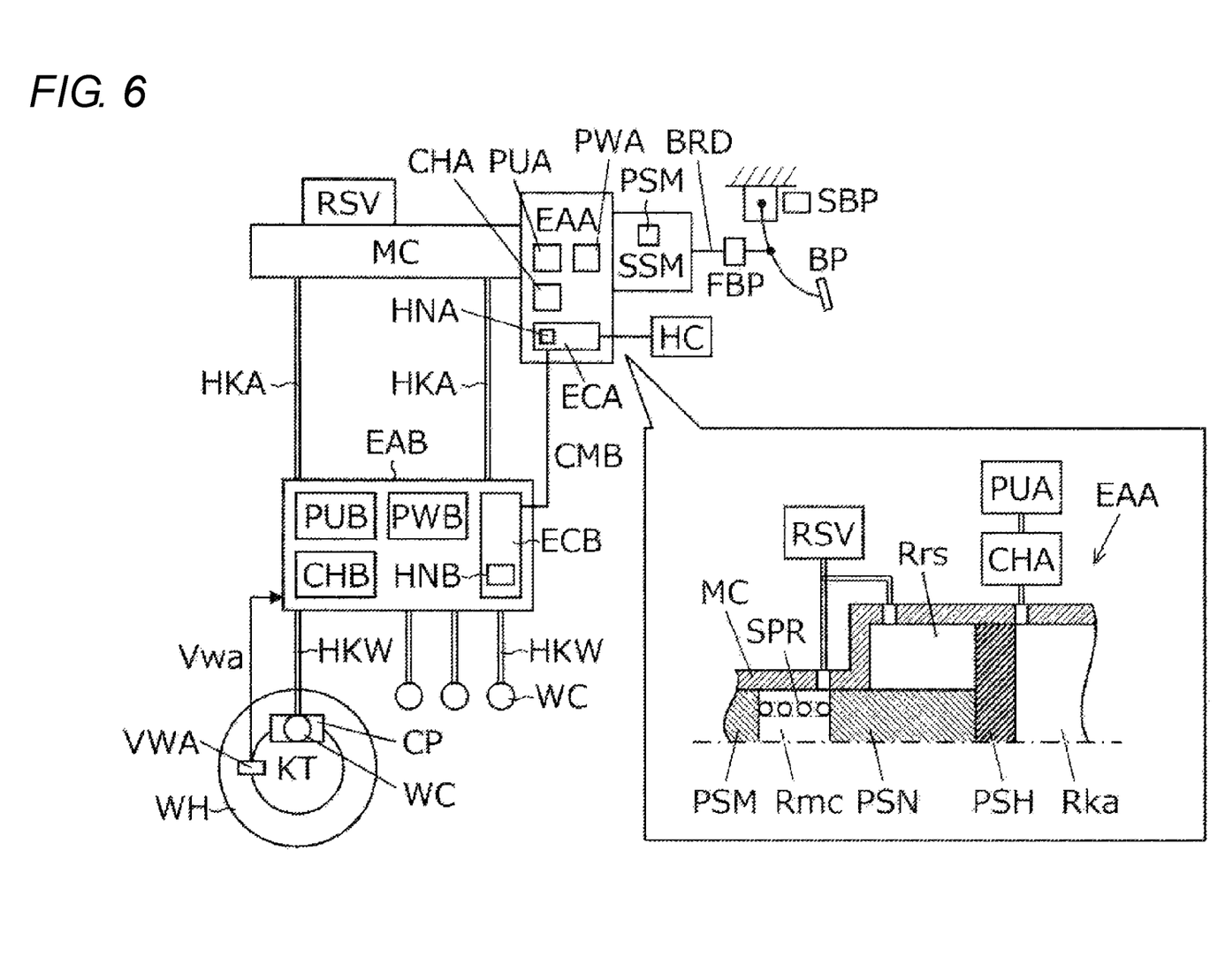
FIG. 6 is an overall configuration diagram for explaining a second embodiment of a braking control device of a vehicle according to the present invention.

A second embodiment of a braking control device of a vehicle according to the present invention will be described with reference to an overall configuration diagram of FIG. 6. In the first embodiment, the wheel cylinder WC is selectively pressurized (so-called brake-by-wire configuration) by one of the first fluid pressure unit EAA and the master cylinder MC. In the second embodiment, the first fluid pressure unit EAA is provided between the master cylinder MC and the braking operation member BP, and the pressurization of the wheel cylinder WC is always performed through the master cylinder MC. As described above, since members having the same symbols, calculation process, signals, characteristics, values, and the like are the same, the difference from the first embodiment will be mainly described.

The first fluid pressure unit EAA is provided between the master cylinder MC and the braking operation member BP. As shown in the cross-sectional view of the balloon portion, the master cylinder MC is of a tandem type, and two master cylinder chambers Rmc partitioned by first and second master pistons PSN, PSM and the inner wall of the master cylinder MC are formed. A compression spring SPR is provided between the first master piston PSN and the second master piston PSM. The master cylinder chamber Rmc is fluidly connected to the second fluid pressure unit EAB through a fluid path HKA. When the first and second master pistons PSN and PSM are moved in the forward direction (to the left in the figure), the volume of the master cylinder chamber Rmc is reduced and the brake fluid is pressure fed from the master cylinder MC toward the wheel cylinder WC. The fluid pressure Pwc of the wheel cylinder WC thereby rises. Conversely, when the master pistons PSN, PSM are moved in the backward direction (to the right in the figure), the volume of the master cylinder chamber Rmc is increased and the brake fluid is absorbed from the wheel cylinder WC to the master cylinder MC. The fluid pressure Pwc of the wheel cylinder WC thereby decreases.

The first fluid pressure unit EAA is provided with a pressurizing piston PSH so as to press the first master piston PSN in the master cylinder MC. A pressurizing chamber Rka is formed by the inner wall of the first fluid pressure unit EAA and the pressurizing piston PSH. Furthermore, a reservoir chamber Rrs is formed by the inner wall of the first fluid pressure unit EAA, the master piston PSN, and the pressurizing piston PSH. The reservoir chamber Rrs is connected to the reservoir RSV and the internal pressure is set at atmospheric pressure. The first pressure regulating mechanism CHA is fluidly connected to the pressurizing chamber Rka. The fluid pressure generated by the first power source PUA is regulated by the first pressure regulating mechanism CHA and supplied to the pressurizing chamber Rka.

When the fluid pressure in the pressurizing chamber Rka is increased, the pressurizing piston PSH presses the master piston PSN in the forward direction. As a result, the first and second master pistons PSN and PSM are moved in the forward direction, and the fluid pressure Pwc of the wheel cylinder WC is increased. On the other hand, when the fluid pressure in the pressurizing chamber Rka is decreased, the force for pressing the master piston PSN in the forward direction by the pressurizing piston PSH is decreased. As a result, the first and second master pistons PSN and PSM are moved in the backward direction by the return spring SPR or the like, and the fluid pressure Pwc of the wheel cylinder WC is decreased.

Similar to the first embodiment, the simulator SSM may be provided. In this case, the braking control device is of a brake-by-wire type, and the operation force Fbp of the braking operation member BP is generated by the simulator SSM.

Furthermore, a configuration in which the simulator SSM is omitted may be adopted. In the configuration without the simulator SSM, the operation force Fbp of the braking operation member BP is generated through the master cylinder MC. Here, the first fluid pressure unit EAA functions as a booster device (brake booster).

In the second embodiment as well, the substitution control is executed when the first fluid pressure unit EAA is in a non-suitable state, similar to the first embodiment. In the substitution control, two different operation characteristics (Bpa-Pwc characteristic, consequently, Bpa-Gxa characteristic) are adopted, and the second fluid pressure unit EAB is controlled. One characteristic is the approximate characteristic CHgp in the specific condition JSP. The approximate characteristic CHgp is a characteristic similar to the suitability characteristic CHgo when the first fluid pressure unit EAA is in a suitable state. The discomfort to the driver is suppressed at the time of malfunction of the first fluid pressure unit EAA by the approximate characteristic CHgp. The other characteristic is the first, second, third notification characteristics CHbp, CHzg, CHkr in the notification condition JHC. The malfunction of the first fluid pressure unit EAA is appropriately notified to the driver according to the relationship of the vehicle deceleration Gxa with respect to the braking operation amount Bpa by these notification characteristics CHbp, CHzg, CHkr. The malfunction of the first fluid pressure unit EAA can be notified to the driver without discomfort by the two different substitution characteristics.

Other Embodiments

In the embodiments described above, the configuration of a disc type braking device (disc brake) has been exemplified as a device for imparting the braking torque to the wheel WH. In this case, the friction member is a brake pad and the rotating member KT is a brake disc. Instead of the disc type braking device, a drum type braking device (drum brake) can be adopted. In the case of the drum brake, a brake drum is adopted instead of the caliper CP. Furthermore, the friction member is a brake shoe, and the rotating member KT is a brake drum.

A configuration in which the first determining means HNA is included in the first controller ECA to determine "whether the first fluid pressure unit EAA is in a suitable state or a malfunctioning state" has been exemplified. However, the present invention is not limited to this configuration, and the appropriateness determination of the first fluid pressure unit EAA may be executed based on information (signal) obtained through the communication bus CMB by another controller connected to the first controller ECA by the communication bus CMB. Then, the result of the appropriateness determination of the first fluid pressure unit EAA is transmitted to the second controller ECB through the communication bus CMB. For example, the appropriateness determination of the first fluid pressure unit EAA can also be carried out by the second controller ECB itself based on a signal passed through the communication bus CMB.

When the start switch STR (also referred to as an ignition switch) is once turned off and then turned on again, substitution control may be configured not to be executed. The operation characteristic in this case is the pressurization characteristic CHmc of the master cylinder MC. The substitution control is a measure to cope with an emergency situation of the malfunction of the first fluid pressure unit EAA.

The first, second, and third notification characteristics CHbp, CHzg, and CHkr have been individually described with reference to FIGS. 3 to 5. These notification characteristics can be combined with the corresponding specific condition JSP. That is, at least one of the "three notification characteristics CHbp, CHzg, CHkr and three corresponding specific conditions JSP" may be adopted (in other words, according to one or more "set of specific conditions and notification characteristics"), and the final notification characteristics and specific conditions can be determined. For example, in a case where the first and second notification characteristics CHbp and CHzg are combined, the notification characteristic (decrease of the fluid pressure increase gradient) is determined according to the first notification characteristic CHbp when the operation amount Bpa is increased, and the notification characteristic (increase in hysteresis) is determined according to the second notification characteristic CHzg when the operation amount Bpa is decreased. Moreover, when the second and third notification characteristics CHzg, CHkr are combined, the fluid pressure gradient is sequentially decreased and the hysteresis is increased with an increase in the number of repetitions NKR.

The invention claimed is:

1. A braking control device for a vehicle that generates a braking force on a wheel by imparting a brake fluid pressure to a wheel cylinder according to an operation of a braking operation member of a vehicle, the braking control device comprising:
a first fluid pressure unit that imparts the brake fluid pressure by a first power source;
a second fluid pressure unit that imparts the brake fluid pressure by a second power source different from the first power source; and
an appropriateness determining means that determines appropriateness of an operating state of the first fluid pressure unit; wherein
when the appropriateness determining means determines that the operating state of the first fluid pressure unit is appropriate, the first fluid pressure unit imparts the brake fluid pressure based on a suitability characteristic, which is a relationship between an operation amount of the braking operation member set in advance and the brake fluid pressure;
the second fluid pressure unit
has a proximity characteristic that substantially matches the suitability characteristic in the relationship between the operation amount of the braking operation member and the brake fluid pressure, and a notification characteristic different from the suitability characteristic in the relationship between the operation amount of the braking operation member and the brake fluid pressure; and
imparts the brake fluid pressure based on at least either one of the proximity characteristic and the notification characteristic when the appropriateness determining means determines that the operating state of the first fluid pressure unit is not appropriate.

2. The braking control device for the vehicle according to claim 1, wherein the second fluid pressure unit
imparts the brake fluid pressure based on the proximity characteristic when an operation equivalent amount equivalent to the operation amount of the braking operation member is smaller than a predetermined value, and
imparts the brake fluid pressure based on the notification characteristic when the operation equivalent amount is greater than or equal to the predetermined value.

3. The braking control device for the vehicle according to claim 2, wherein
the second fluid pressure unit sets the predetermined value to a value equivalent to "0.3 to 0.4 G" of a deceleration of the vehicle.

4. The braking control device for the vehicle according to claim 1, wherein
the second fluid pressure unit
imparts the brake fluid pressure based on the proximity characteristic when the operation amount increases, and
imparts the brake fluid pressure based on the notification characteristic when the operation amount decreases.

5. The braking control device for the vehicle according to claim 1, wherein
the second fluid pressure unit
counts the number of repetitions of a series of operations of the braking operation member from a time when the appropriateness determining means determines that the operating state of the first fluid pressure unit is not appropriate based on the operation amount,
imparts the brake fluid pressure based on the proximity characteristic when the number of repetitions is smaller than a predetermined number of times, and imparts the brake fluid pressure based on the notification characteristic when the number of repetitions is greater than or equal to the predetermined number of times.

6. The braking control device for the vehicle according to claim 5, wherein
the second fluid pressure unit decreases the notification characteristic according to an increase in the number of repetitions when the number of repetitions is greater than or equal to the predetermined number of times.

7. The braking control device for the vehicle according to claim 2, wherein
the second fluid pressure unit
imparts the brake fluid pressure based on the proximity characteristic when the operation amount increases, and
imparts the brake fluid pressure based on the notification characteristic when the operation amount decreases.

8. The braking control device for the vehicle according to claim 2, wherein
the second fluid pressure unit
counts the number of repetitions of a series of operations of the braking operation member from a time when the appropriateness determining means determines that the operating state of the first fluid pressure unit is not appropriate based on the operation amount,
imparts the brake fluid pressure based on the proximity characteristic when the number of repetitions is smaller than a predetermined number of times, and
imparts the brake fluid pressure based on the notification characteristic when the number of repetitions is greater than or equal to the predetermined number of times.

9. The braking control device for the vehicle according to claim 8, wherein
the second fluid pressure unit decreases the notification characteristic according to an increase in the number of repetitions when the number of repetitions is greater than or equal to the predetermined number of times.

10. The braking control device for the vehicle according to claim 3, wherein
the second fluid pressure unit
imparts the brake fluid pressure based on the proximity characteristic when the operation amount increases, and
imparts the brake fluid pressure based on the notification characteristic when the operation amount decreases.

11. The braking control device for the vehicle according to claim 3, wherein
the second fluid pressure unit
counts the number of repetitions of a series of operations of the braking operation member from a time when the appropriateness determining means determines that the operating state of the first fluid pressure unit is not appropriate based on the operation amount,
imparts the brake fluid pressure based on the proximity characteristic when the number of repetitions is smaller than a predetermined number of times, and
imparts the brake fluid pressure based on the notification characteristic when the number of repetitions is greater than or equal to the predetermined number of times.

12. The braking control device for the vehicle according to claim 11, wherein
the second fluid pressure unit decreases the notification characteristic according to an increase in the number of repetitions when the number of repetitions is greater than or equal to the predetermined number of times.

13. The braking control device for the vehicle according to claim 4, wherein
the second fluid pressure unit
counts the number of repetitions of a series of operations of the braking operation member from a time when the appropriateness determining means determines that the operating state of the first fluid pressure unit is not appropriate based on the operation amount,
imparts the brake fluid pressure based on the proximity characteristic when the number of repetitions is smaller than a predetermined number of times, and
imparts the brake fluid pressure based on the notification characteristic when the number of repetitions is greater than or equal to the predetermined number of times.

14. The braking control device for the vehicle according to claim 13, wherein
the second fluid pressure unit decreases the notification characteristic according to an increase in the number of repetitions when the number of repetitions is greater than or equal to the predetermined number of times.

15. The braking control device for the vehicle according to claim 7, wherein
the second fluid pressure unit
counts the number of repetitions of a series of operations of the braking operation member from a time when the appropriateness determining means determines that the operating state of the first fluid pressure unit is not appropriate based on the operation amount,
imparts the brake fluid pressure based on the proximity characteristic when the number of repetitions is smaller than a predetermined number of times, and
imparts the brake fluid pressure based on the notification characteristic when the number of repetitions is greater than or equal to the predetermined number of times.

16. The braking control device for the vehicle according to claim 15, wherein
the second fluid pressure unit decreases the notification characteristic according to an increase in the number of repetitions when the number of repetitions is greater than or equal to the predetermined number of times.

17. The braking control device for the vehicle according to claim 10, wherein
the second fluid pressure unit
counts the number of repetitions of a series of operations of the braking operation member from a time when the appropriateness determining means determines that the operating state of the first fluid pressure unit is not appropriate based on the operation amount,
imparts the brake fluid pressure based on the proximity characteristic when the number of repetitions is smaller than a predetermined number of times, and
imparts the brake fluid pressure based on the notification characteristic when the number of repetitions is greater than or equal to the predetermined number of times.

18. The braking control device for the vehicle according to claim 17, wherein
the second fluid pressure unit decreases the notification characteristic according to an increase in the number of repetitions when the number of repetitions is greater than or equal to the predetermined number of times.

* * * * *